United States Patent Office 2,847,463
Patented Aug. 12, 1958

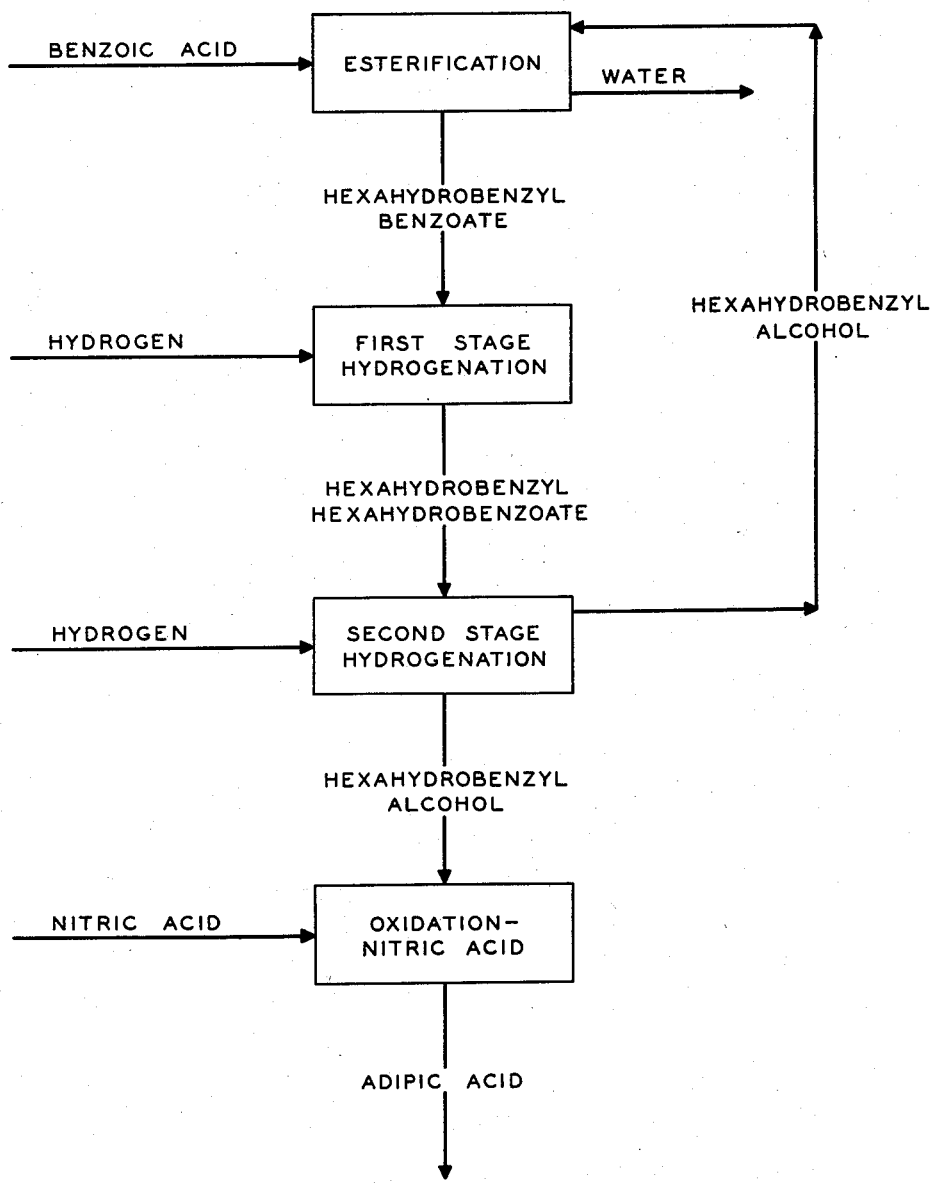

2,847,463
PREPARATION OF ADIPIC ACIDS

William G. Toland, San Rafael, and Edwin A. Goldsmith, Berkeley, Calif., assignors to California Research Corporation, San Francisco, Calif., a corporation of Delaware Application March 30, 1955, Serial No. 497,954

13 Claims. (Cl. 260—531)

The present invention relates to the preparation of adipic acid and of α- and β-alkyl-substituted adipic acids, hereinafter included in the term "adipic acids." More particularly, the invention has to do with a process for the production of adipic acid involving the oxidation of hexahydrobenzyl alcohol obtained by a novel process which yields two moles of the alcohol for each mole employed originally. Thus, in a cyclic operation a portion of the alcohol can be recycled for the preparation of additional alcohol, in the ratio of two moles for each mole recycled, and a portion converted into adipic acid.

The reactions involved in the process contemplated by the present invention can be represented by the following equation:

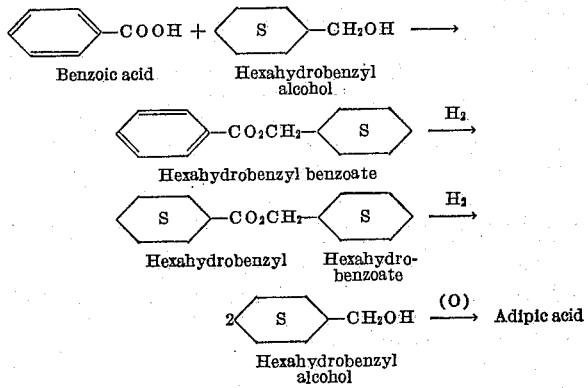

The invention is accordingly based on a process for the preparation of adipic acid which comprises esterifying benzoic acid and hexahydrobenzyl alcohol to produce hexahydrobenzyl benzoate ester, hydrogenating the ester with a ring hydrogenating catalyst to produce the saturated hexahydrobenzyl hexahydrobenzoate ester, hydrogenating the saturated ester with an ester reducing catalyst to produce approximately two molar parts of hexahydrobenzyl alcohol for each molar part of hexahydrobenzyl hexahydrobenzoate, returning a portion of the hexahydrobenzyl alcohol to the esterifying zone to react with further quantities of benzoic acid, oxidizing the remaining hexahydrobenzyl alcohol to produce adipic acid.

More specifically, esterification of the benzoic acid and hexahydrobenzyl alcohol can be effected either with a catalyst or thermally in the absence of a catalyst. Thermal esterification of benzoic acid and hexahydrobenzyl alcohol can be effected, for example, in a closed zone or vessel, e. g., an autoclave, by a process which comprises heating the reactants, under autogenous pressure, to a temperature within about the range of 400° F. to 700° F., preferably around 600° F., for a period of time varying from about one minute to about one hour, the lower the temperature the longer the reaction time and vice versa. It is preferred to operate with a molar excess of the alcohol, although equal molar proportions of acid and alcohol can be employed. Thus the alcohol can vary from about 1 to 10 moles for each mole of the acid, a molar excess of 2 to 5 moles of alcohol for each mole of acid being most advantageously employed. Water of esterification can be removed by bleeding as the esterification reaction proceeds or by flashing following completion of reaction. While a solvent for the reactants can be employed, it is preferred to operate without a solvent thus eliminating the problems attendant its later removal.

A convenient way of preparing the novel ester contemplated by the invention, is by a process employing an esterification catalyst, such as benzene or toluene sulfonic acid. When proceeding in this fashion, lower reaction temperatures can be employed. In this embodiment of the invention, essentially quantitative conversion to the ester can be effected by refluxing the acid and alcohol, in the presence of the catalyst, the water of esterification being removed azeotropically, with a suitable azeotroping agent, e. g., benzene. Upon completion of reaction, the reaction mixture is cooled and filtered. The filtrate is extracted with a basic-reacting agent, e. g., sodium bicarbonate, the organic layer being then washed with water, dried and distilled.

Following the preparation of the hexahydrobenzyl benzoate ester, the ester is hydrogenated to saturate the phenyl ring. In effecting such hydrogenation reaction any suitable catalyst effective to hydrogenate the aromatic ring or nucleus can be employed, such as platinum dioxide and platinum on carriers, or nickel, such as sponge nickel or nickel on a support. In the catalytic hydrogenation of the ring of the ester derived from the benzoic acid we prefer to use rhodium, as taught, for example, in U. S. Patent No. 2,675,390. The rhodium catalyst is prepared in a known manner, for example, in the form of a powder, granules or pellets supported on a suitable carrier, e. g., dehydrated alumina, activated carbon, kieselguhr, bentonite, asbestos, etc., by the treatment of the carrier material with a solution of a suitable rhodium compound, the rhodium compound being then reduced to rhodium metal. The hexahydrobenzyl benzoate hydrogenation step can be carried out by contacting the ester and hydrogen with the catalyst in a manner apparent to those skilled in the art, e. g., by continuously passing hydrogen and ester in a reaction zone containing the catalyst or by batchwise contact in a confined zone of hydrogen, ester and catalyst. In addition, the hydrogenation reaction can be effected in the presence of a solvent, e. g., acetic acid, in which event lower reaction temperatures, of the order of room temperatures, can be employed. It is often desirable, however, to effect the hydrogenation reaction in the absence of a solvent, thus obviating the problems attendant its later removal. When operating in the absence of a solvent, best results are achieved by employing elevated temperatures of the order of 100–150° F. and higher. Following the hydrogenation reaction, the reaction mixture as such can be subjected to a treatment involving the hydrogenation of the ester group of the hexahydrobenzyl hexahydrobenzoate by means of a suitable ester hydrogenation catalyst. If desired, the product resulting from the ring hydrogenation can be purified as by distillation to remove solvent and any side reaction products.

Hydrogenation of hexahydrobenzyl hexahydrobenzoate can be effected in a similar manner as explained above, except that in place of the ring hydrogenation catalyst there is employed any suitable ester hydrogenation catalyst such as the hydrogenation-promoting metals or metal oxides, for example, reduced nickel, tin, lead, or copper. Particularly suitable are the chromates or chromites, for example, copper chromite. As will occur to those skilled in the art the ester hydrogenation step is carried out at elevated temperatures and pressures. Suitable temperatures range from about 300° F. up to about 700° F. and higher, preferably 500–600° F., and pressures of about 500 p. s. i. g. to about 3000 p. s. i. g. and higher to maintain a high concentration of hydrogen or increase the rate of reduction. Following ester hydrogenation, the reaction product mixture, now comprising hexahydrobenzyl alcohol, is cooled, the catalyst filtered off, and the resulting product, as such, or if desired, further purified, as by distillation, can be employed in the preparation of adipic acid as hereinbelow described.

While hexahydrobenzyl alcohol can be prepared, as above described, by a process involving ring and ester hydrogenation as independent steps, we have found it convenient to effect hydrogenation of the hexahydrobenzyl benzoate to the alcohol in one step by combined catalysis, i. e., the use conjointly of both the ring and ester hydrogenation catalysts. In carrying out this embodiment of the invention, similar apparatus and procedure can be employed as in the earlier described hydrogenations. During the one-step hydrogenation, reaction conditions of temperature and pressure are followed which effect hydrogenation of the ring followed by hydrogenation of the ester, that is, under conditions of temperature and pressure already described effective to bring about the desired hydrogenations. A convenient way of effecting such hydrogenations is to contact the hexahydrobenzyl benzoate ester in a confined zone with a mixture of the catalysts, e. g., rhodium and copper chromite, in the presence of hydrogen under an elevated pressure of the order of 1000–1500 p. s. i. g., reaction temperatures being at first low, e. g., 100–150° F. to effect ring hydrogenation, followed by pressuring to the desired pressure of 1000–3000 p. s. i. g. and increasing of temperature, e. g., to 400–700° F. to effect hydrogenation of the ester. Essentially quantitative conversions of the ester to the alcohol are obtained. The alcohol is separated from any catalyst fines by filtration, and can be used as such or further purified, as by distillation.

Following the preparation of the hexahydrobenzyl alcohol, adipic acid can be prepared therefrom by known procedures. For example, the hexahydrobenzyl alcohol is contacted with a mixture of nitric acid of the desired concentration at suitable temperatures, following which the reaction mixture is chilled and filtered. The filter cake is then washed with cold water, pressed and allowed to dry to obtain the desired crystalline adipic acid in white crystals. The concentration of the nitric acid usually varies from about 40 to 60% and often contains an oxidation catalyst such as manganese, chromium, cerium, iron, nickel, copper, vanadium, cobalt, lead, tungsten, vanadic acid or compounds of any of these metals, such as sulfates, oxides, or the nitrates. The oxidation is advantageously accomplished at temperatures between about 100° F. and about 150° F., a temperature of about 125 to 150° F. being preferred. When the reaction is complete, the reaction mixture is chilled to a low temperature of the order of 30° F. to 60° F. and filtered, the adipic acid being recovered as above described.

In place of unsubstituted benzoic acid there may be employed alkyl substituted benzoic acids to produce the α- and β-substituted adipic acids. Thus, a 3-alkyl benzoic acid, e. g., 3-methyl benzoic acid, would produce a mixture of α- and β-alkyl adipic acids, e. g., α- and β-methyl adipic acids. Similarly, a 4-substituted benzoic acid, such as 4-t-butyl benzoic acid would produce a β-alkyl adipic acid, e. g., β-t-butyl adipic acid. As a result of using substituted benzoic acids the correspondingly substituted hexahydrobenzyl alcohol is produced, and in its recycle in the process will produce the corresponding esters.

The invention will now be described in connection with the appended drawing which is a flow sheet illustrating in block diagram features and process steps of one embodiment of the invention.

As indicated by the drawing, benzoic acid and hexahydrobenzyl alcohol are advantageously esterified thermally in a closed zone, e. g., a tubular reaction zone. Benzoic acid and preferably an excess of the alcohol, e. g., 10 moles of alcohol per mole of benzoic acid, are heated under autogenous pressures to a temperature of the order of 600° F. for about 10 minutes, water of esterification being bled off, as indicated, during the course of reaction.

Following the line of flow in the drawing, the reaction mixture, including the ester hexahydrobenzyl benzoate from the esterification zone is conducted to a first hydrogenation zone, and in the presence of hydrogen and a ring hydrogenation catalyst, e. g., rhodium on alumina support, the ester is subjected to ring hydrogenation or reduction. It is preferred to operate with an excess of alcohol in the esterification. Hydrogenation can be effected at ordinary temperatures and pressures, up to temperatures of the order of 100° F.–150° F. and under superatmospheric pressures to promote the rate of reaction without removing this alcohol.

The reaction product resulting from the first hydrogenation step, including hexahydrobenzyl hexahydrobenzoate, is then subjected to a second stage hydrogenation treatment for the purpose of producing hexahydrobenzyl alcohol. This is effected by contacting the hexahydrobenzyl hexahydrobenzoate and hydrogen under hydrogenation conditions effective to reduce the ester group with an ester hydrogen catalyst, e. g., copper chromite. Accordingly, temperatures of the order of 300° F. to 700° F., and pressures of the order of 500 p. s. i. g. to 3000 p. s. i. g. and higher will be found satisfactory in effecting ester reduction. A portion of the hexahydrobenzyl alcohol is recycled to the esterification zone, and the remaining employed for any purpose desired, e. g., the production of adipic acid, as hereinabove described, or in the production of esters of use as plasticizers. For most purposes the alcohol, free of the catalyst, can be employed as such without further purification, yields being essentially quantitative.

While adipic acid can be produced from phenol, the ultimate raw material for which is benzene, the present process is characterized by the important advantage that the benzoic acid can be prepared by the oxidation of toluene, more abundantly available in petroleum refinery streams. Another advantage resides in the use of hexahydrobenzyl alcohol for the preparation of the adipic acid and also in the esterification step, to result ultimately in the preparation of two molar parts of alcohol for each molar part employed. In the esterification reaction the use of this alcohol, rather than the lower alcohols, not convertible to adipic acid, e. g., methanol or ethanol, obviates the necessity of removing the lower alcohols, and simplifies the equipment required.

Obviously many modifications and variations of the invention as hereinbefore set forth, may be made without departing from the spirit and scope thereof and, therefore, only such limitations should be imposed as are indicated in the appended claims.

We claim:

1. A process for converting benzoic acid to hexahydrobenzoyl alcohol, which comprises esterifying benzoic acid with hexahydrobenzyl alcohol in an esterification zone to produce hexahydrobenzyl benzoate, reducing the hexahydrobenzyl benzoate to hexahydrobenzyl hexahydrobenzoate by catalytic hydrogenation, producing from said hexahydrobenzyl hexahydrobenzoate by catalytic hydrogenation hexahydrobenzyl alcohol in an amount of two molar parts from each molar part of hexahydrobenzyl hexahydrobenzoate, and returning a portion of the hexahydrobenzyl alcohol to the esterification zone to react with more benzoic acid.

2. A process for converting benzoic acid to hexahydrobenzyl alcohol, which comprises heating benzoic acid and hexahydrobenzyl alcohol in an esterification zone at a temperature ranging from about 400° F. to 700° F. for a period of time sufficient to produce hexahydrobenzyl benzoate, ester, catalytically hydrogenating said ester at a temperature ranging from about 100° F. to 150° F. to produce hexahydrobenzyl hexahydrobenzoate, catalytically hydrogenating said hexahydrobenzyl hexahydrobenzoate at an elevated temperature from about 300° F. to about 700° F. thereby producing hexahydrobenzyl alcohol in an amount of two molar parts for each molar part of hexahydrobenzyl alcohol employed in the esterification zone, and returning a portion of the hexahydrobenzyl alcohol to the esterification zone for reaction with more benzoic acid.

3. Process according to claim 2, wherein said catalytic hydrogenation of said hexahydrobenzyl benzoate ester is accomplished with a rhodium hydrogenation catalyst and the catalytic hydrogenation of said hexahydrobenzyl hexahydrobenzoate is accomplished with a copper chromite hydrogenation catalyst.

4. Process according to claim 3, wherein the rhodium catalyst is rhodium metal supported on alumina.

5. Process of converting one molar part of hexahydrobenzoyl hexahydrobenzoate to two molar parts of hexahydrobenzyl alcohol, which comprises hydrogenating said part of hexahydrobenzyl hexahydrobenzoate at elevated temperatures and pressures to said parts of hexahydrobenzyl alcohol.

6. Process according to claim 5, wherein said catalytic hydrogenation is accomplished with a copper chromite hydrogenation catalyst at hydrogenation temperatures in the range from about 300° F. to 700° F.

7. Process for producing adipic acid from hexahydrobenzyl alcohol, which comprises esterifying benzoic acid with hexahydrobenzyl alcohol in an esterification zone to produce hexahydrobenzyl benzoate, reducing the hexahydrobenzyl benzoate to hexahydrobenzyl hexahydrobenzoate by catalytic hydrogenation, producing from said hexahydrobenzyl hexahydrobenzoate by catalystic hydrogenation approximately two molar parts of hexahydrobenzyl alcohol from each part of hexahydrobenzyl hexahydrobenzoate, returning about one-half of the hexahydrobenzyl alcohol to the esterification zone to react with more benzoic acid, and oxidizing the remainder of the hexahydrobenzyl alcohol to adipic acid with nitric acid.

8. Process according to claim 7, wherein the benzoic acid and hexahydrobenzyl alcohol are thermally esterified at a temperature ranging from about 400° F. to 600° F.

9. Process according to claim 8, wherein said catalytic hydrogenation of said hexahydrobenzyl benzoate is accomplished with a rhodium hydrogenation catalyst.

10. Process according to claim 9, wherein said catalytic hydrogenation of said hexahydrobenzyl hexahydrobenzoate is accomplished with a copper chromite hydrogenation catalyst.

11. Process according to claim 9, wherein the rhodium catalyst is supported on alumina.

12. A process for producing adipic acid, which comprises esterifying benzoic acid with hexahydrobenzyl alcohol in an esterification zone, hydrogenating the resultant hexahydrobenzyl benzoate to hexahydrobenzyl hexahydrobenzoate, hydrogenating the hexahydrobenzyl hexahydrobenzoate to produce a reaction product consisting essentially of hexahydrobenzyl alcohol, returning a portion of the hexahydrobenzyl alcohol to the esterification zone with further quantities of benzoic acid, and oxidizing a portion of the hexahydrobenzyl alcohol with nitric acid to produce adipic acid.

13. A process for producing adipic acid, which comprises catalytically hydrogenating hexahydrobenzyl hexahydrobenzoate to produce a reaction product consisting essentially of hexahydrobenzyl alcohol and oxidizing a portion of the hexahydrobenzyl alcohol with nitric acid to produce adipic acid.

References Cited in the file of this patent
UNITED STATES PATENTS

| | | |
|---|---|---|
| 2,091,800 | Adkins et al. | Aug. 31, 1937 |
| 2,228,261 | Ellingboe | Jan. 14, 1941 |
| 2,675,390 | Rosenblott | Apr. 13, 1954 |
| 2,698,339 | Hawkins | Dec. 28, 1954 |